(12) United States Patent
Peterson et al.

(10) Patent No.: US 9,720,978 B1
(45) Date of Patent: Aug. 1, 2017

(54) FINGERPRINT-BASED LITERARY WORKS RECOMMENDATION SYSTEM

(71) Applicant: Amazon Technologies, Inc., Seattle, WA (US)

(72) Inventors: Jessica Faye Peterson, Seattle, WA (US); Christopher Robin Peery, Seattle, WA (US); Marco William Arguedas-Rodriguez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 14/502,969

(22) Filed: Sep. 30, 2014

(51) Int. Cl.
  *G06Q 30/02* (2012.01)
  *G06F 17/30* (2006.01)
  *G06F 17/27* (2006.01)

(52) U.S. Cl.
  CPC ...... *G06F 17/3053* (2013.01); *G06F 17/2705* (2013.01); *G06F 17/30011* (2013.01)

(58) Field of Classification Search
  CPC ......... G06F 17/30864; G06F 17/30867; G06F 17/30386; G06F 17/30029; G06Q 30/02
  USPC ................. 707/723, 732, 733, 734
  See application file for complete search history.

(56) References Cited

U.S. PATENT DOCUMENTS

| | | | | |
|---|---|---|---|---|
| 8,478,664 B1* | 7/2013 | Xavier | ............... | G06Q 30/0631 705/26.1 |
| 2002/0107853 A1* | 8/2002 | Hofmann | .......... | G06F 17/30699 |
| 2006/0020614 A1* | 1/2006 | Kolawa | .................. | G06Q 30/02 |
| 2015/0154246 A1* | 6/2015 | Allen | .................. | G06F 17/3053 707/758 |
| 2015/0324356 A1* | 11/2015 | Andres Gutierrez | | H04N 21/436 707/734 |

OTHER PUBLICATIONS

Kelley, Use This Site to See Which of Your Facebook Friends Is Most Similar to You, http://www.businessinsider.com/five-labs-facebook-personality-app-2014-6, retrieved on May 8, 2017.

(Continued)

*Primary Examiner* — Hosain Alam
*Assistant Examiner* — Robert F May
(74) *Attorney, Agent, or Firm* — Knobbe Martens Olson & Bear LLP (57) ABSTRACT

A system that recommends literary works to a user based on identified trends of how text in the literary works liked and/or disliked by the user are written and/or structured is provided. For example, the system may analyze the text of a literary work to identify one or more metrics. Based on the identified metrics, the system can generate an analytical summary called a fingerprint for the literary work. The ratings assigned to literary works by the user may be used in conjunction with the generated fingerprints to generate positive and/or negative models for the user. The positive model captures aspects of literary works that the user likes and the negative model captures aspects of literary works that the user dislikes. The system can then compare some or all of the generated fingerprints in a literary works fingerprint database with the positive and/or negative models to select literary works to recommend to the user.

17 Claims, 6 Drawing Sheets

(56) References Cited

OTHER PUBLICATIONS

Kelley, Scientists Used Facebook for the Largest Ever Study of Language and Personality — and the Results are Groundbreaking, http://www.businessinsider.com/facebook-study-on-language-and-personality-2013-10, retrieved on May 8, 2017.
Musical DNA, http://www.radiolab.org/story/91515-musical-dna/, retrieved on May 8, 2017.
Schwartz et al., "Personality, Gender, and Age in the Language of Social Media: The Open-Vocabulary Approach," PLOS ONE, vol. 8, Issue 9, e73791, pp. 1-16, Sep. 2013.
Pandora Media, Inc., "About the Music Genome Project", http://www.pandora.com/about/mgp, as captured on Jul. 28, 2014.

* cited by examiner

FINGERPRINT-BASED LITERARY WORKS RECOMMENDATION SYSTEM

BACKGROUND

People generally like to read books that are similar to other books that they have read and liked. Traditionally, a person could discover books that are similar to books that the person read and liked by speaking with a friend or visiting a bookstore. For example, a friend may have read the same book that the person liked and may be familiar with other books by that author or in that genre. In some cases, the friend may not have knowledge of any specific book that is similar to the book that the person liked, but may share a common taste in literature as the person and may provide a recommendation accordingly.

Systems exist that use simple dimensions to identify books that are similar. For example, the systems can (1) analyze item purchase histories and item viewing histories or a large number of users, (2) compare catalog or bibliographic data (e.g., author, subject, title, etc.) to look for titles with similar attributes, and/or (3) apply traditional collaborative filtering to users' ratings of individual books. However, these existing systems often fail to capture more complex relationships between two or more books that actually matter to a user and that are useful in providing high quality book recommendations.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

As described above, traditionally, a person could discover new books by asking for a recommendation from a friend or visiting a bookstore. To automate this process, several computer-based recommendation engines have been developed. As one example, a conventional computer-based recommendation engine can identify a set of books bought by users that also bought a first book. If a user later purchases the first book, the conventional computer-based recommendation engine can suggest one or more books in the first set of books as books that the user may also like. However, this approach may not accurately capture what aspect of the first book that the user found appealing. Thus, the suggested books may not actually fit the user's preferences.

As another example, another conventional computer-based recommendation engine can allow users to indicate books that they have read in the past and the ratings that they have given to each book. Friends or acquaintances of these users can view a user's reading history and his or her assigned ratings to discover new books. In addition, the recommendation engine can use the user-assigned ratings to generate personalized recommendations, such as by using a collaborative filtering algorithm. However, while the user, via the ratings, can indicate what books he or she did or did not like and why, this approach may not fully identify the aspects of a book that the friend or acquaintance may find appealing or unappealing. The rating may identify an aspect of a book that the user found appealing, but may leave out a discussion of another aspect of the book that the friend or acquaintance may actually find unappealing. Furthermore, this approach may not identify the commonalities between books liked by a user and whether those common traits are also traits that the friend or acquaintance find appealing. Thus, the suggested books may not actually fit the friend or acquaintance's preferences.

Accordingly, the embodiments described herein provide systems and methods for recommending literary works to a user based on identified semantic and/or syntactic trends in the literary works liked and/or disliked by the user. For example, as literary works are added to a digital library, the literary works can be analyzed for the purpose of generating fingerprints that indicate the semantic and/or syntactic characteristics of the respective literary work. The fingerprints may include a set of semantic and/or syntactic metrics that provide an analytical summary of the respective literary work, as described in greater detail below. Often, users provide feedback on literary works that they have read (e.g., via reviews or ratings) and this feedback, along with the generated fingerprints, can be used to generate positive and/or negative models that are unique to a user. The positive model may be an aggregation of fingerprints that are associated with literary works that the user liked (e.g., reviewed or rated highly). Similarly, the negative model may be an aggregation of fingerprints that are associated with literary works that the user disliked (e.g., reviewed or rated poorly). As the user continues to provide feedback on additional literary works, the positive and/or negative models can be updated to reflect the additional feedback provided by the user.

At some later time, the user may visit a page (e.g., a content page or a network page, such as a web page) that provides information on literary works. Using the positive and/or negative models associated with the user, the page may offer unsolicited recommendations to the user or offer recommendations to the user at the user's explicit request. For example, the positive model can be compared with one or more fingerprints. If a fingerprint closely matches the positive model, the literary work associated with the fingerprint may be flagged as a possible recommendation. Likewise, the negative model can be compared with one or more fingerprints as well. If a fingerprint closely matches the negative model, the literary work associated with the fingerprint may be flagged as a literary work that should not be recommended. The literary work associated with a fingerprint that best matches the positive model may be provided to the user as a recommendation. Alternatively, several literary works associated with fingerprints that closely match the positive model can be provided to the user as recommendations in a ranked or unranked order.

The literary works recommendation techniques described herein can be implemented in various possible environments, such as in any environment in which literary works can be analyzed across various features and/or dimensions.

For example, one possible environment includes a server and several databases that can be accessed by the server. The server (e.g., a recommendation system) may retrieve the text of literary works from a literary works database (e.g., the text may be stored in a digital format) and analyze the text to compute a set of pre-defined metrics that may comprise the fingerprints for each literary work. The server may perform the analysis prior to any request for a literary works recommendation. The metrics can be represented with numerical or non-numerical values and can include semantic information (e.g., data related to the content of the text, such as the topics discussed in the text, the personalities of the characters, etc.) and/or syntactical occurrences.

Semantic metrics can be derived using machine-learning topic clusters and/or other such techniques. Example semantic metrics can include sentiment analysis (e.g., positive, negative, neutral, other, etc.), latent semantic analysis (e.g., degree to which two or more documents are semantically related), average semantic distance among terms, degree of gender bias, degree of subject-matter bias, occurrence of non-obvious themes, and/or a number of figures of speech. Semantic metrics can also include story or plot related data, such as number of characters, types of characters (e.g., whether the protagonist and/or ancillary characters are male, female, or some combination of both), narrative tone, narrative technique (e.g., first person, third person, etc.), number of authors, book subject, age of author(s), gender of author(s), number of publications by the author(s), and/or the like.

Syntactic metrics can include lexical data and/or grammatical data. Lexical data can include punctuation (e.g., a possible indicator of tone), case structure (e.g., percent of text that is in caps), number of chapters in the literary work, number of pages in the literary work, number of paragraphs in the literary work, number of lines in the literary work, number of lines in a chapter, number of elements in an index, number of unique words, number of illustrations or graphs, presence or non-presence of a glossary, average number of words per paragraph, average number of words per sentence, average number of sentences per paragraph, average number of paragraphs per chapter, average number of lines per chapter, average number of sentences per chapter, average number of illustrations or graphs per chapter, average word length, degree of complexity of the index, and/or the like. Grammatical data can include word count, word or lexical complexity and/or density (e.g., an average word length, with a higher word length indicating greater complexity and/or density, etc.), sentence complexity (e.g., average sentence length, with a higher sentence length indicating greater complexity, etc.), percentage of the text that is dialogue, number of characters that contribute to the dialogue (e.g., whether the dialogue in the text includes more speeches and monologues or more conversations between characters), number of sections of dialogue, number of unique verbs (e.g., subdivided by type of verb, such as emotional, aggressive, happy, etc.), number of proper nouns, number of unique pronouns, number of pronouns (e.g., subdivided by type, such as personal, interrogative, possessive, indefinite, reflexive, etc., which may indicate a possible gender dominance), number of non-main language terms, number of foreign language terms, number of fictional language terms, average number of words in sections of dialogue, average number of sentences in dialogue, frequency of appearance of dialog sections, frequency of appearance of characters, usual or unusual grammatical structure for the language, tense of writing distribution (e.g., percentage of text in past, present, or future tense), and/or the like. Metrics can also include biographical data about the literary work, such as the title, the author, the genre, the date first published, country of origin, and/or the like. In some embodiments, data from one or more of the computed syntactic metrics can be used to compute a semantic metric.

Based on the computed metrics, the server can generate a fingerprint for the literary work. The fingerprint may be a data structure that includes one or more of the computed metrics. The fingerprint, along with an identity of the literary work to which the fingerprint is associated, can be stored in a database, such as a literary works fingerprint database. The server can generate and store a fingerprint for any number of literary works (e.g., hundreds of thousands of literary works, millions of literary works, etc.). For example, the server can generate and store a fingerprint for each literary work in a digital library (e.g., where a digital library can include millions of literary works). As new literary works are added to the digital library, the server may be notified and immediately or nearly immediately commence generating fingerprints for storage.

A user, after reading or reviewing a literary work, may provide feedback (e.g., a rating) regarding the literary work, which can be stored in a user database in an entry associated with the user. The ratings assigned to literary works by the user may be used in conjunction with the generated fingerprints to generate positive and/or negative models for the user. The positive model may capture aspects of literary works that the user likes (e.g., literary works that have been assigned a rating above a threshold value) and the negative model may capture aspects of literary works that the user dislikes (e.g., literary works that have been assigned a rating below a threshold value). For example, the server may retrieve, from the user database, the user's feedback to identify literary works that the user likes and/or dislikes. Based on this information the server may retrieve, from the literary works fingerprint database, fingerprints associated with literary works that the user likes and aggregate the fingerprints (e.g., individually aggregate the metrics that comprise a fingerprint, such as by determining an average value of a metric across all liked literary works, using a logistic regression, clustering, implementing machine-learning techniques, and/or using any other method for doing a numerical or non-numerical analysis) to generate the positive model. Likewise, fingerprints associated with literary works that the user dislikes may be retrieved from the literary works fingerprint database and aggregated (e.g., individually aggregate the metrics that comprise a fingerprint, such as by determining an average value of a metric across all disliked literary works, using a logistic regression, clustering, implementing machine-learning techniques, and/or using any other method for doing a numerical or non-numerical analysis) to generate the negative model. As the user continues to provide feedback on additional literary works, the server can be notified when additional feedback has been provided and update the positive and/or negative models accordingly.

At some later time, the user may visit a page that offers unsolicited literary works recommendations or that provides literary works recommendations upon request. Once the user visits the page or a recommendation is specifically requested, the server can then compare some or all of the generated fingerprints in the literary works fingerprint database (e.g., filters, such as by author, genre, author, etc., can be applied to limit the number of generated fingerprints that are compared) with the positive and/or negative models to determine and/or recommend one or more literary works that the user may like. For example, a comparison of a fingerprint to a positive or negative model may include comparing the individual metrics of the fingerprint with the aggregated metrics of the model. However, the metrics may not all be compared with each other. In some embodiments, the server can implement machine-learning techniques to determine which metrics in the model are important (e.g., which metrics in the model affect a user's preference) and use those metrics in the comparison. If a fingerprint closely matches the positive model, then the server may mark the literary work associated with the fingerprint as a literary work that could be provided as a recommendation with respect to a single user. Likewise, if a fingerprint closely matches the negative model, then the server may mark the literary work associated with the fingerprint as a literary work that should not be provided as a recommendation with respect to the single user.

The server can generate unique positive and/or negative models for a plurality of users. For example, unique positive and/or negative models can be generated for some or all users that access the digital library. Furthermore, the positive and/or negative models may be stored in a database in association with the user, such as the user database. When a user rates a new literary work, the positive and/or negative model for that user can be updated, as described above, and stored again in the user database.

The metrics identified by the server to generate the fingerprints, as described above, can be supplemented with metrics identified using other techniques to enhance the generated fingerprint. For example, other models like genre affinity (e.g., it is known that the user likes literary works of a certain genre), author interest (e.g., it is known that the user likes literary works by certain authors), and/or the techniques employed by conventional computer-based recommendation engines, such as those described above, can be used to generate additional metrics. These additional metrics, along with the original metrics described above, can be included in the fingerprints. The positive and/or negative models may then be generated using fingerprints that include both the original and the additional metrics.

The server may score and rank the recommended literary works. For example, literary works that more closely match the positive model and/or less closely match the negative model can be ranked higher than literary works that less closely match the positive model and/or more closely match the negative model (e.g., a literary work that most closely matches the positive model can be ranked first, followed by literary works that more closely match the positive model in order of how close they match the positive model).

In some embodiments, the server can generate a targeted electronic advertisement related to a literary work that is suggested for a user based on the positive and/or negative models associated with the user. For example, the electronic advertisement can be an image, a link to purchase or view the literary work, an aural and/or visual description of the literary work, and/or any combination of the examples provided herein. Data that instructs a user computing device to display the targeted electronic advertisement in, for example, a browser window, can be transmitted to the user computing device.

As described above, the server can provide one or more recommendations to the user. The server can choose a literary work to recommend based on how well the literary work matches the positive model and/or does not match the negative model. The server can also choose a literary work to recommend based on whether the literary work can provide the server with more information about the user to improve future recommendations. For example, two literary works may be of equal or nearly equal relatedness and both could match the positive model well. The first literary work may be represented by a fingerprint similar to that of literary works that the user has liked. Thus, the server may not learn any new information about the user by suggesting the first literary work (and subsequently receiving a rating of the first literary work by the user). The second literary work may, however, include some metrics with values that are not similar to the values of metrics of literary works that the user has liked. By suggesting the second literary work, the server may learn whether the metrics with different values affect the user's opinion of the literary work, thereby improving the value of future recommendations. Thus, the server may suggest the second literary work.

The recommendation service provided by the server may provide several benefits. For example, the server can generate the fingerprints, generate the positive and/or negative models, and/or update the positive and/or negative models in real-time (e.g., within a few seconds), thereby allowing the server to provide quickly a recommendation to the user that is based on identified semantic and/or syntactic trends in the literary works that the user likes and dislikes. The recommendation can be provided quickly and based on all literary works in a digital library, not just select works that have been read by a friend or acquaintance. As another example, the server can identify trends in the literary works that the user likes and/or dislikes that may not be apparent to a human. Unbeknownst to the user, the user may like literary works that are predominately written using a particular sentence structure or that include many characters with little dialogue. Even given a list of literary works that a user likes, a human may not be able to identify the common traits within those literary works that the user finds appealing (or the common traits within those literary works that do not affect whether the user finds a literary work appealing or unappealing). For example, the human may not recognize certain traits within the literary works, may focus on one set of traits while ignoring other, possibly more important traits, and/or the like. By computing the fingerprints of a literary work, aggregating fingerprints by whether the user likes or dislikes a literary work, and comparing the generated positive and/or negative models with the fingerprints of other literary works in a digital library, the server can identify (e.g., via the use of machine-learning techniques) specific trends, address scaling issues, remove human bias, and/or identify non-obvious relationships and therefore provide more meaningful recommendations.

By generating fingerprints for literary works once and reusing the fingerprints to generate positive and/or negative models for a plurality of users, the server can reduce the processing overhead associated with analyzing the text of literary works. Generating the fingerprints once and storing them for later use can also reduce the real-time latency when providing recommendations. As described herein, the server stores the unique positive and/or negative models for each user, but updates the positive and/or negative models each time the user rates a new literary work rather than generating a completely new positive and/or negative model. Thus, the server reduces the amount of computing resources that may be needed to generate the models and improves the user experience by providing faster recommendations.

While the techniques disclosed herein are described with respect to literary works, this is not meant to be limiting. The techniques described herein can apply to other types of content. For example, the techniques described herein can be applied to audiovisual works (e.g., television shows, movies, etc.), music, and/or the like. For example, the audio of the audiovisual works could be parsed to identify metrics similar to those described above and the video of the audiovisual works could be analyzed to identify metrics like lighting, animation versus live-action, speed of scenes (e.g., by how quickly pixels change, which can indicate that the audiovisual work has a lot of action), number of characters (e.g., via face recognition), and/or the like. As another example, music can be parsed to identify metrics similar to those described above, as well as metrics like tempo, pitch, volume, musical instruments, vocal versus instrumental, and/or the like.

While the techniques disclosed herein are described with respect to positive and negative models, this is not meant to be limiting. The recommendations described herein can be provided using other types of models, such as models that are generated based on what literary works a user likes to purchase when buying a gift, what literary works a user tends to read or purchase at certain times of the year (e.g., summer, Christmas, etc.), what literary works a user reads or purchases when at a certain location, and/or the like.

System Components

Figure 1A:
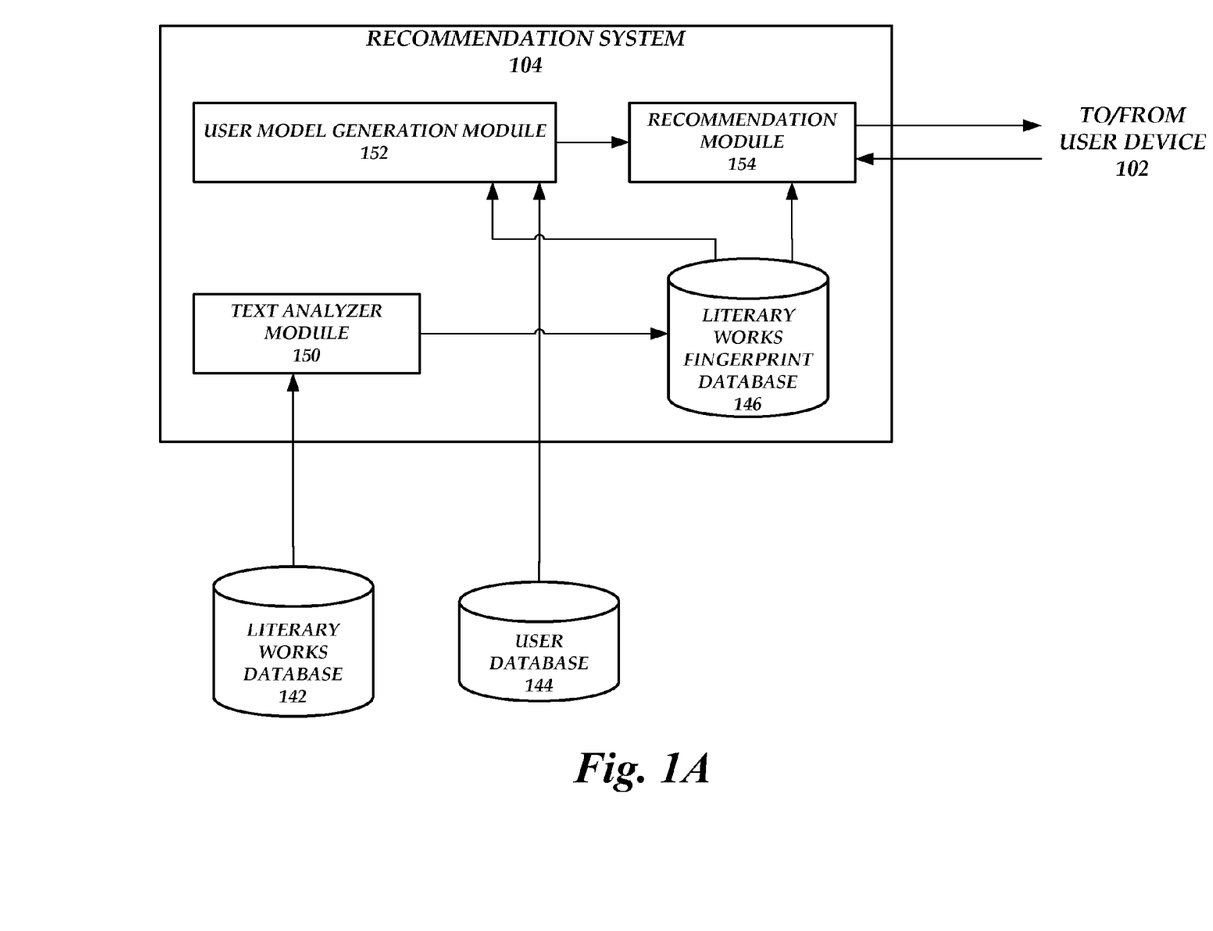
FIG. 1A illustrates various blocks in a literary works recommendation system that can be used to provide a user with a literary works recommendation.

FIG. 1A illustrates various blocks in a literary works recommendation system 104 that can be used to provide a user with a literary works recommendation. The recommendation system 104 may perform three main operations: generate fingerprints, generate and/or update positive and/or negative models, and provide recommendations.

Generating Fingerprints

In an embodiment, a literary works database 142 stores the text of literary works in a digital format. The literary works database 142 may be located external to the recommendation system 142, such as on a separate system or server. The recommendation system 104 may include a text analyzer module 150 that generates fingerprints based on the text stored in the literary works database 142. For example, the text analyzer module 150 may retrieve the text of a literary work from the literary works database 142 and parse the text to identify values for one or more of the metrics described above. The text analyzer module 150 may use text processing techniques, such as natural language processing or other simple text parsing mechanisms, to analyze the text and identify values for the metrics described above.

In an embodiment, the text analyzer module 150 uses external data or information to identify values for some of the metrics. For example, the text analyzer module 150 may identify values for word or lexical complexity and/or density and for narrative tone by using open source resources, such as WordNet. For each analyzed literary work, the text analyzer module 150 may compile the identified metrics into a fingerprint and store the fingerprint in a literary works fingerprint database 146. As literary works are added to the literary works database 142, the text analyzer module 150 may be notified that the text of a new literary work is available and may generate a fingerprint for the literary work for storage in the literary works fingerprint database 146.

Generating and Updated Positive and Negative Models

In an embodiment, a user database 144 stores feedback provided by users for various literary works and positive and/or negative models associated with some or all of the users. For example, the user database 144 stores an entry for each user, where the entry includes ratings assigned to literary works by the respective user and positive and/or negative models associated with the respective user. The user database 144 may be located external to the recommendation system 142 and/or the literary works database 142, such as on a separate system or server.

The recommendation system 104 may include a user model generation module 152 that generates and updates positive and/or negative models for one or more users. For example, if a positive and/or negative model has not been generated for a user, the user model generation module 152 may retrieve information on the literary works rated by the user from the user database 144 and may retrieve the fingerprints of the literary works that have been rated from the literary works fingerprint database 146.

Once the user model generation module 152 has retrieved the ratings and the fingerprints, the user model generation module 152 can separate the fingerprints into those fingerprints that are associated with literary works that were assigned a high rating by the user (e.g., a rating above a threshold value, such as 3 stars) and those fingerprints that are associated with literary works that were assigned a low rating by the user (e.g., a rating below a threshold value, such as 3 stars). The fingerprints that are associated with literary works that were assigned a high rating by the user can be aggregated to form the positive model. For example, aggregating fingerprints can include aggregating metrics that comprise the fingerprints. Each common metric within the fingerprints can be aggregated to generate a single value or range of values for the respective metric. Aggregation can include determining an average value for the respective metric, a median value for the respective metric, a range of values that fall within a certain percentile for the respective metric (e.g., between the 45th and 55th percentile), and/or the like. Aggregation can also include performing a logistic regression, clustering, implementing machine-learning techniques, and/or using any other method for doing a numerical or non-numerical analysis. Each of the aggregated metric values can be combined to form the positive model. Furthermore, the user model generation module 152 can determine statistical characteristics for each of the aggregated metric values (e.g., variance, standard deviation, etc.) based on the individual metric values and include those in the positive model. The user model generation module 152 can generate the negative model in the same manner by aggregating the fingerprints that are associated with literary works that were assigned a low rating by the user. The positive and/or negative models may be stored in the user database 144 and/or the user model generation module 152 (e.g., the user model generation module 152 may include a data store for storing the models).

As users rate additional literary works, the user database 144 may be updated. The user model generation module 152 may be notified that the user database 144 has been updated based on a rating provided by a user, retrieve a fingerprint corresponding to the newly rated literary work from the literary works fingerprint database 146, retrieve the positive and/or negative models associated with the user, and update the positive and/or negative models based on the fingerprint in a manner as described above. For example, the user model generation module 152 can update a model by re-aggregating the fingerprints now associated with that model. The updated positive and/or negative models can then be stored in the user database 144 in an entry associated with the given user.

In further embodiments, the text analyzer module 150 and the user model generation module 152 supplement the positive and/or negative models with additional information. For example, the metrics identified by the text analyzer module 150 to generate the fingerprints, as described above, can be supplemented with metrics identified using other techniques to enhance the generated fingerprint. For example, other models like genre affinity (e.g., it is known that the user likes literary works of a certain genre), author interest (e.g., it is known that the user likes literary works by certain authors), and/or the techniques employed by conventional computer-based recommendation engines, such as those described above, can be used by the text analyzer module 150 to generate additional metrics. These additional metrics, along with the original metrics described above, can be included in the fingerprints by the user model generation module 152. The positive and/or negative models may then be generated using fingerprints that include both the original and the additional metrics.

Providing Recommendations

In an embodiment, the recommendation system 104 further comprises a recommendation module 154 that can generate one or more literary works recommendations for a user. For example, when the user visits a page that provides unsolicited literary works recommendations or when the user explicitly requests a recommendation, the recommendation module 154 may be so notified. The recommendation module 154 can retrieve the positive and/or negative models from the user database 144 via the user model generation module 152 or directly from the user model generation module 152 (e.g., if stored directly therein) and compare the positive and/or negative models with some or all of the fingerprints stored in the literary works fingerprint database 146 (e.g., filters such as by author, genre, author, etc., can be applied to limit the number of generated fingerprints that are compared). If the fingerprint of a literary work matches the positive model within a threshold (e.g., some or all of the metrics of the literary work each match the respective aggregated metric values of the positive model within a threshold value, where the threshold values can be different for each metric), then the recommendation module 154 marks the literary work as one that may be recommended to the user. Likewise, if the fingerprint of a literary work matches the negative model within a threshold, then the recommendation module 154 blocks or inhibits that literary work from being recommended to the user.

For example, a comparison of a fingerprint to a positive or negative model may include comparing the individual metrics of the fingerprint with the aggregated metrics of the model. However, the recommendation module 154 may not compare all of the metrics with each other. In some embodiments, the recommendation module 154 can implement machine-learning techniques to determine which metrics in the model are important (e.g., which metrics in the model affect a user's preference) and use those metrics in the comparison.

After comparing some or all of the fingerprints of the literary works stored in the literary works fingerprint database 146 with the positive and/or negative models, the recommendation module 154 can provide one or more recommendations to the user (e.g., who may be operating a user device 102). In some embodiments, the recommendation module 154 ranks the literary works that have a fingerprint that matches the positive model within a threshold and provides an identity of the highest ranked literary work or a list of the identities of the highest ranked literary works to the user device 102. The literary works may be ranked by how closely their fingerprints match the positive model (e.g., with the closest matching literary work being ranked the highest). In other embodiments, the recommendation module 154 provides one or more recommendations, where the identities of the literary works are chosen at random from a list of those literary works that have fingerprints that match the positive model within a threshold.

In further embodiments, the recommendation module 154 can also choose a literary work to recommend based on a determination that the literary work, if read and rated by the target user, may reveal new information regarding the user's preferences. For example, two literary works may be of equal or nearly equal relatedness and both could match the positive model well. The first literary work may be represented by a fingerprint similar to that of literary works that the user has liked. Thus, the recommendation system 104 may not learn any new information about the user by suggesting the first literary work (and subsequently receiving a rating of the first literary work by the user). The second literary work may, however, include some metrics with values that are not similar to the values of metrics of literary works that the user has liked. By suggesting the second literary work, the recommendation system 104 may learn whether the metrics with different values affect the user's opinion of the literary work, thereby improving the value of future recommendations. Thus, the recommendation module 154 may suggest the second literary work.

If no literary works have fingerprints that match the positive model within a threshold, the recommendation module 154 may provide one or more literary works as recommendations that have fingerprints that do not match the negative model within a threshold. The literary works that do not match either model within a threshold can also be scored and ranked by the recommendation module 154.

The recommendation module 154 may provide the recommendation to the user device 102 in the form of data that causes the user device 102 to display information about the recommendation. For example, the recommendation module 154 may transmit data to the user device 102 that, when executed by a browser application running on the user device 102, causes the user device 102 to display an identity of the recommendations in a user interface.

In an embodiment, the recommendation includes an identity of the literary work and/or a link (e.g., to the corresponding book detail page) or option to review, purchase, or otherwise learn more information about the literary work. In other embodiments, the recommendation is in the form of an electronic advertisement. For example, the electronic advertisement can be an image, a link to purchase or view the literary work, an aural and/or visual description of the literary work, and/or any combination of the examples provided herein.

System Components in an Example Environment

Figure 1B:
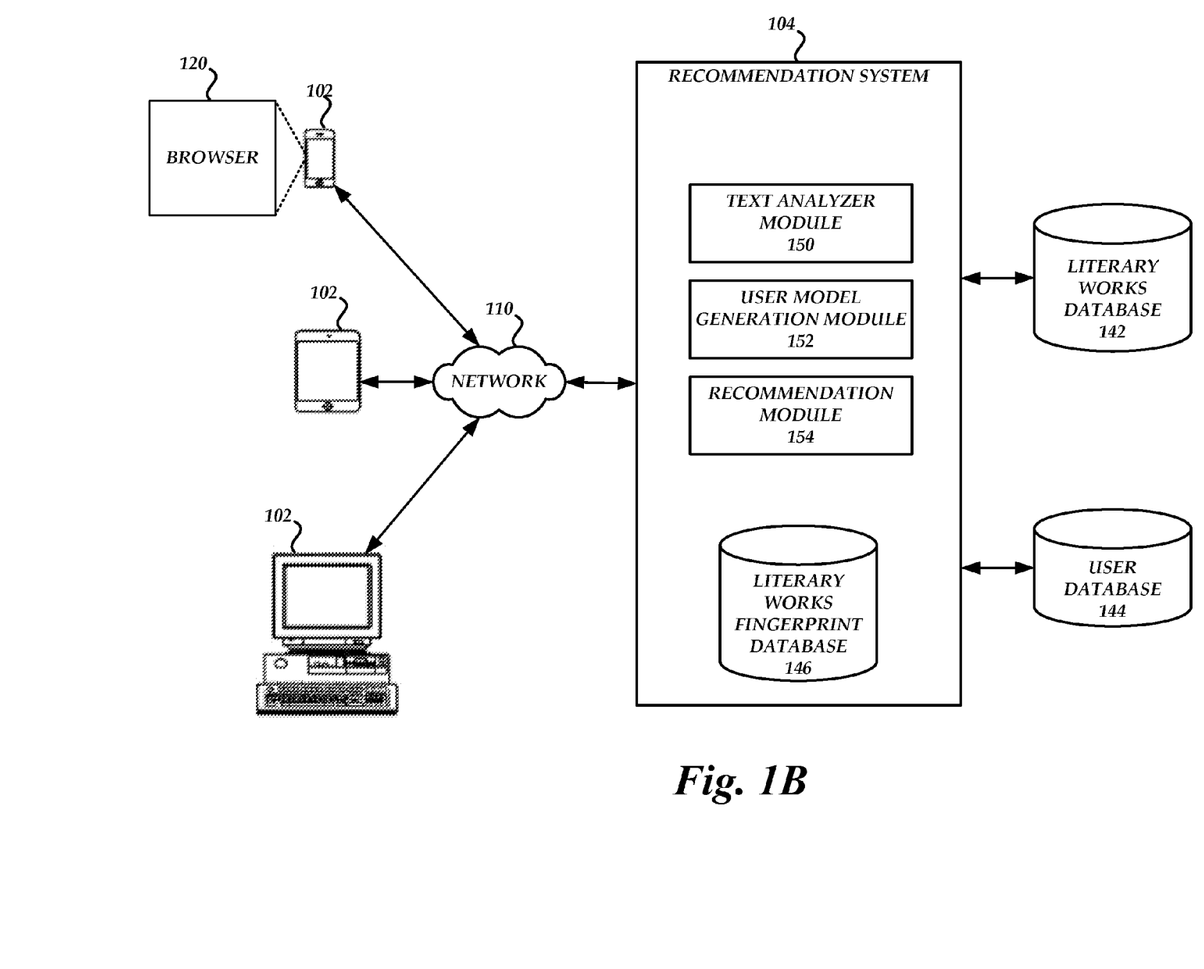
FIG. 1B illustrates an exemplary literary work recommendation environment with the recommendation system of FIG. 1A according to one embodiment.

FIG. 1B illustrates an exemplary literary work recommendation environment with the recommendation system 104 of FIG. 1A according to one embodiment. The environment shown in FIG. 1B may be one of many possible environments in which the recommendation system 104 can be implemented. As illustrated in FIG. 1B, the environment includes various user devices 102 and the recommendation system 104. The recommendation system 104 may include multiple distinct computers or machines, some of which may be assigned to different recommendation tasks than others. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The environment may include any number of distinct user devices 102. In addition, multiple (e.g., two or more) recommendation systems 104 may be used. For example, separate recommendation systems 104 may be located so that they are close (in either a geographical or networking sense) to groups of current or potential user devices 102. In such a configuration, a user device 102 may receive an indication of one or more literary works that a user associated with the user device 102 may enjoy or be interested in via the recommendation system 104 to which it is closest, rather than all user devices 102 receiving recommendations via a single recommendation system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application to communicate via the network 110 with other computing systems, such as the recommendation system 104, in order to request and/or receive recommendations. The user devices 102 may execute a browser application 120 that can be used by a user to access a page that provides literary works recommendations.

The recommendation system 104 can be a computing system configured to analyze the text of literary works, generate fingerprints for each of the analyzed literary works, generate positive and/or negative models for a plurality of users, and provide targeted recommendations of literary works that individual users may be interested in. For example, the recommendation system 104 can be a physical server or group of physical servers that may be accessed via the network 110.

As described above with respect to FIG. 1A, the recommendation system 104 may include various modules, components, data stores, and the like to provide the analysis and recommendation functionality described herein. For example, the recommendation system 104 may include the text analyzer module 150, the user model generation module 152, the recommendation module 154, and the literary works fingerprint database 146. In some embodiments, the recommendation system 104 may include additional or fewer modules than those shown in FIG. 1B. The recommendation system 104 may be part of a larger electronic catalog system or site that provides functionality for users to, e.g., interactively browse, search for, review, rate, tag, purchase, sell and obtain recommendations of catalog items such as book titles; examples of such systems are described, e.g., in U.S. Pat. Nos. 7,685,074, 7,472,077 and 8,122,020, the disclosures of which are hereby incorporated by reference.

The text analyzer module 150, the user model generation module 152, and/or the recommendation module 154 can operate in parallel and for multiple users at the same time. For example, recommendations for unique user devices 102 may be requested and the components of the recommendation system 104 can generate the recommendations simultaneously or nearly simultaneously for the unique user devices 102 in real-time.

As described above, in some embodiments, the literary works database 142 is located external to the recommendation system 104. For example, the literary works database 142 may be stored and managed by a separate system or server (e.g., a server that digitizes texts) and may be in communication with the recommendation system 104 via a direct connection or an indirect connection (e.g., via a network, such as the network 110). In other embodiments, not shown, the literary works database 142 is located within the recommendation system 104.

The user database 144 may also be located external to the recommendation system 104. For example, the user database 144 may be stored and managed by a separate system or server (e.g., a literary works rating server) and may be in communication with the recommendation system 104 via a direct connection or an indirect connection (e.g., via a network, such as the network 110). In other embodiments, not shown, the user database 144 is located within the recommendation system 104.

Example Process for Recommending a Literary Work

Figure 2:
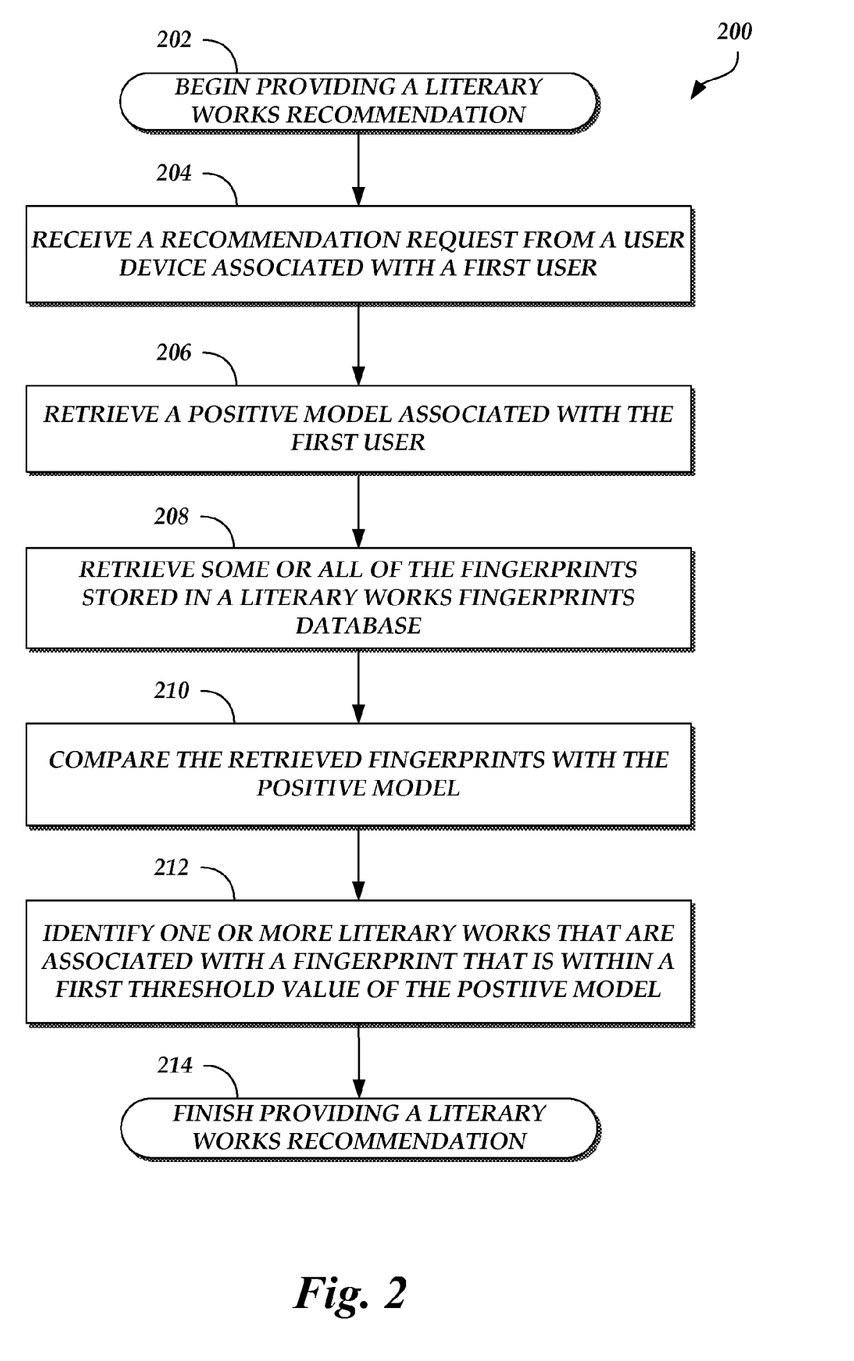
FIG. 2 illustrates a process that may be used to provide a literary works recommendation to a user.

FIG. 2 illustrates a process 200 that may be used by the recommendation system 104 to provide a literary works recommendation to a user. As an example, the recommendation system 104 of FIG. 1 can be configured to implement the literary works recommendation process 200. The literary works recommendation process 200 begins at block 202.

At block 204, a recommendation request is received from a user device associated with a first user. The recommendation request may include an explicit or implicit request for recommendations of literary works that the first user may be interested in reading or purchasing (e.g., the user device may explicitly request the recommendation or the user may merely access or visit a network page that provides recommendations). For example, the user device may request a page that is configured to display personalized book recommendations.

At block 206, a positive model associated with the first user is retrieved. The positive model may include an aggregation of fingerprints that are associated with literary works that the user likes. For example, the literary works that the user likes may be those that received a rating above a threshold value. The threshold value may be a numerical value, such as 7 if literary works are rated on a scale of 1 to 10, or a number of stars, such as 3 if literary works are rated on a scale of 1 to 5 stars.

At block 208, some or all of the fingerprints stored in a literary works fingerprint database are retrieved. The fingerprints may be generated based on a semantic and/or syntactic analysis of the respective literary work. The analysis may be performed off-line, prior to the request for the recommendation. In an embodiment, the semantic analysis includes an analysis of the content of the text (e.g., the topics discussed in the text, the personalities of the characters, etc.). The syntactic analysis may include an analysis of how the text of a literary work is written and structured and identifying numerical values for metrics, such as one or more of the metrics identified above. The first fingerprints may include a set of values for one or more metrics.

At block 210, the retrieved fingerprints are compared with the positive model. For example, the positive model and the retrieved fingerprints may be compared by comparing the individual metrics that make up the positive model and the retrieved fingerprints.

At block 212, one or more literary works that are associated with a fingerprint that is within a first threshold value of the positive model is identified. In an embodiment, a fingerprint is within a first threshold value of the positive model if each individual metric comprised within the fingerprint is within a threshold value of the corresponding metric value in the positive model. The identity of the one or more literary works may be provided to the user in the form of a suggestion or electronic advertisement. After the identity of one or more literary works is identified, the literary works recommendation process 200 may be complete, as shown in block 214. The results (recommendations) may be output for display to the user, or may be combined with the results of other recommendation processes (such as those described in the above-referenced patents) for purposes of selecting literary works to recommend.

Example Positive and Negative Models

Figure 3A:
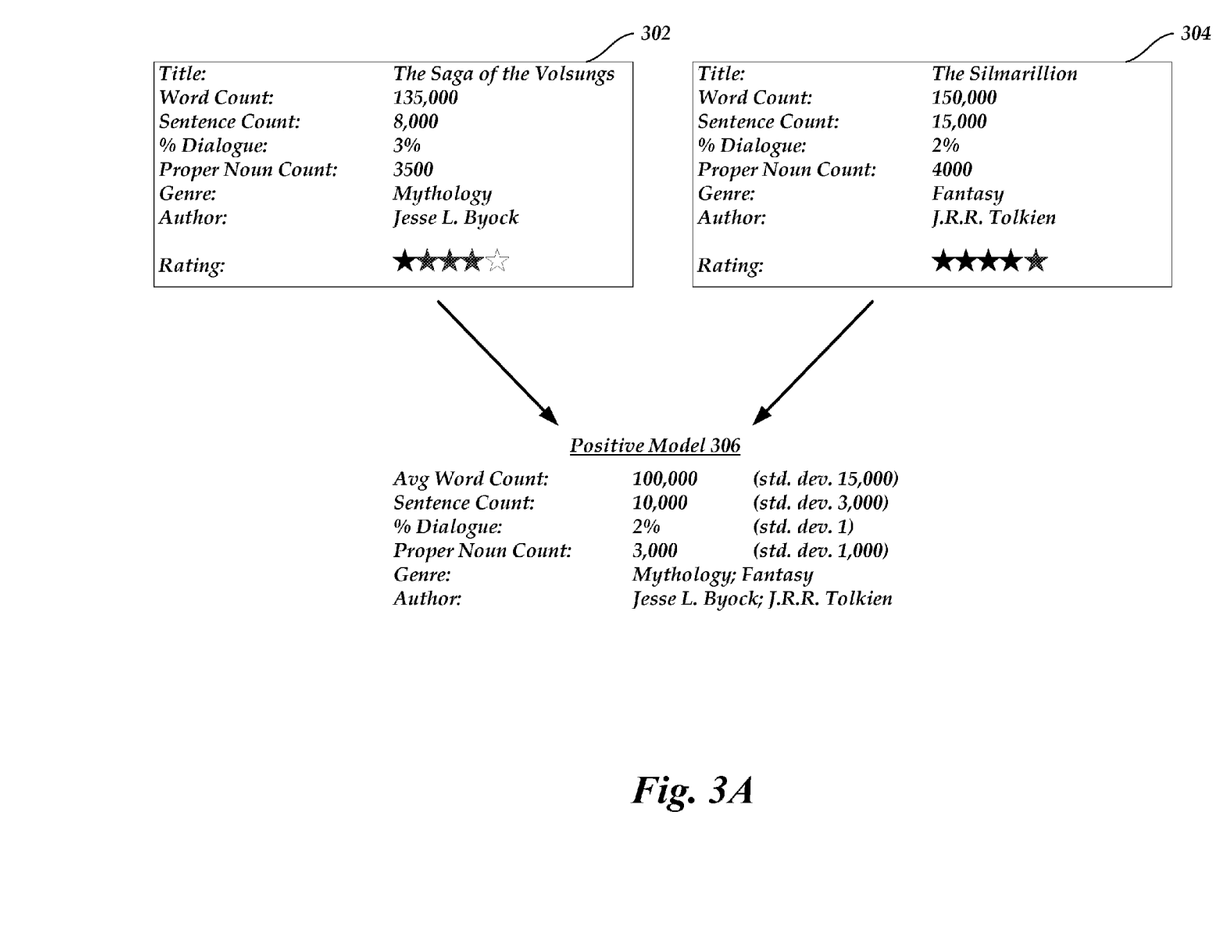
FIGS. 3A-B illustrate example positive and negative models.
Figure 3B:
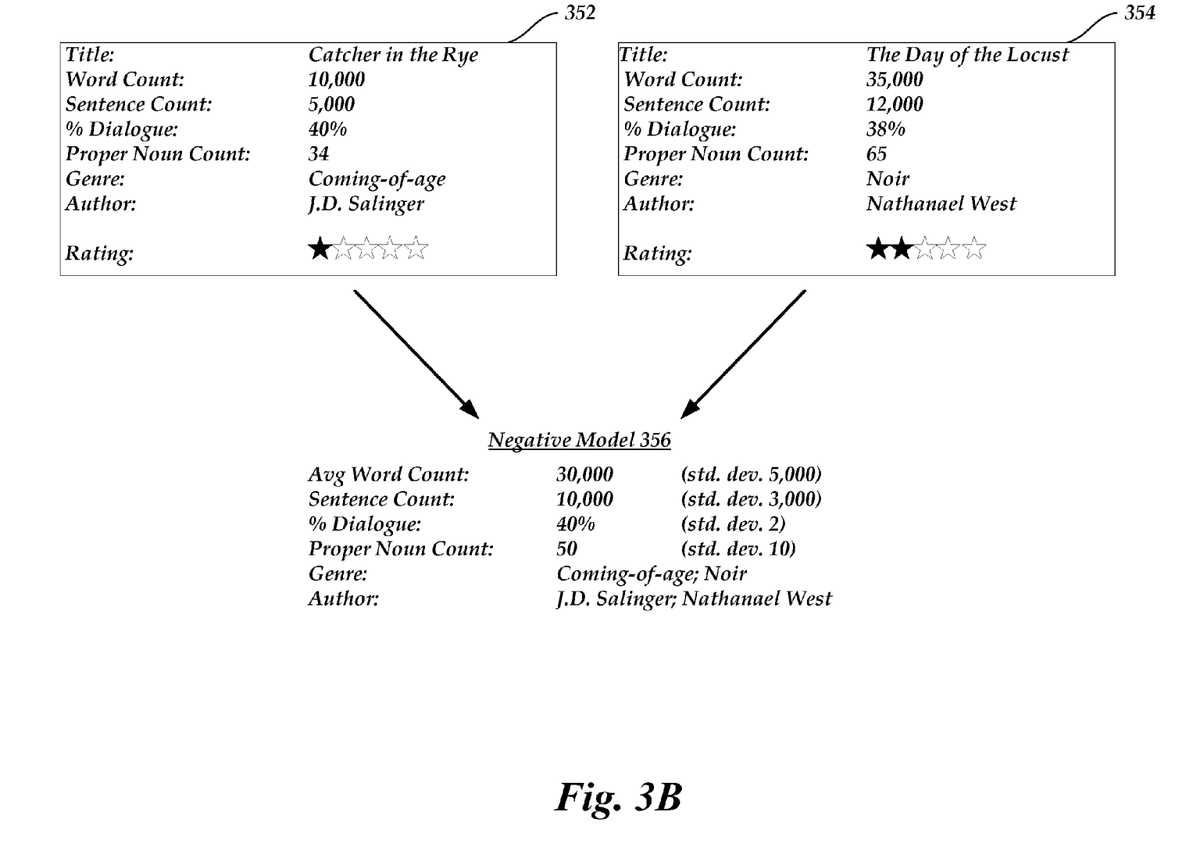

FIGS. 3A-B illustrate example positive and negative models. As illustrated in FIG. 3A, two literary works 302 and 304 are identified as having a rating assigned by a user that is above a threshold value (e.g., 3 stars out of 5). The literary works 302 and 304 have both been analyzed to determine numerical values for a set of metrics: word count, sentence count, dialogue percentage, and proper noun count. The metrics are included in the fingerprint for each literary work 302 and 304. Metrics like genre and author have also been noted and are included as part of the fingerprint for each literary work 302 and 304.

Using the fingerprints for literary works 302 and 304 and possibly other literary works assigned a rating by the user above the threshold value (not shown), a positive model 306 can be generated. As illustrated in FIG. 3A, the metrics of the fingerprints of the literary works 302 and 304 (and possibly other literary works) are aggregated to determine numerical values (e.g., for word count, sentence count, dialogue percentage, and proper noun count) or a list of strings (e.g., for genre and author) for the metrics of the positive model 306. The metrics of the literary works 302 and 304 may be aggregated into a fingerprint by using a logistic regression, clustering, implementing machine-learning techniques, and/or using any other method for doing a numerical or non-numerical analysis. In addition, the positive model 306 includes additional statistical characteristics (e.g., standard deviation) that can be used to determine whether the fingerprint of a literary work matches or closely matches the positive model 306. For example, a fingerprint for a literary work that includes a word count of 90,000 may be considered to match the positive model 306 with respect to word count because it is within a standard deviation of the aggregate word count value. If the fingerprint also includes numerical values for the metrics that are all within the stated standard deviation of the aggregate numerical metric value of the positive model 306, then the literary work may be considered to match the positive model 306 and may be considered as a literary work that should be provided to the user device 102 as a recommendation.

Likewise, as illustrated in FIG. 3B, two literary works 352 and 354 are identified as having a rating assigned by the user that is below a threshold value, which may be the same threshold value as above (e.g., 3 stars) or a different threshold value (e.g., 2.5 stars). The literary works 352 and 354 have both been analyzed to determine numerical values for a set of metrics: word count, sentence count, dialogue percentage, and proper noun count. The metrics are included in the fingerprint for each literary work 352 and 354. As described above with respect to FIG. 3A, metrics like genre and author have also been noted and are included as part of the fingerprint for each literary work 352 and 354.

Similar to the process as described above with respect to FIG. 3A, using the fingerprints for literary works 352 and 354 and possibly other literary works assigned a rating by the user below the threshold value (not shown), a negative model 356 can be generated. As described above, in some embodiments, the fingerprints are aggregated to generate the negative model 356 by aggregating the individual metrics of the fingerprints. As illustrated in FIG. 3B, the metrics of the fingerprints of the literary works 352 and 354 (and possibly other literary works) are aggregated to determine numerical values (e.g., for word count, sentence count, dialogue percentage, and proper noun count) or a list of strings (e.g., for genre and author) for the metrics of the negative model 356. The metrics of the literary works 352 and 354 may be aggregated using a logistic regression, clustering, implementing machine-learning techniques, and/or using any other method for doing a numerical or non-numerical analysis. In addition, the negative model 356 includes additional statistical characteristics (e.g., standard deviation) that can be used to determine whether the fingerprint of a literary work matches or closely matches the negative model 356. For example, a fingerprint for a literary work that includes a word count of 25,000 may be considered to match the negative model 356 with respect to word count because it is within a standard deviation of the aggregate word count value. If the fingerprint also includes numerical values for the metrics that are all within the stated standard deviation of the aggregate numerical metric value of the negative model 356, then the literary work may be considered to match the negative model 356 and may not be considered as a literary work that should be provided to the user device 102 as a recommendation.

Example Network Page Viewed on a User Device

Figure 4:
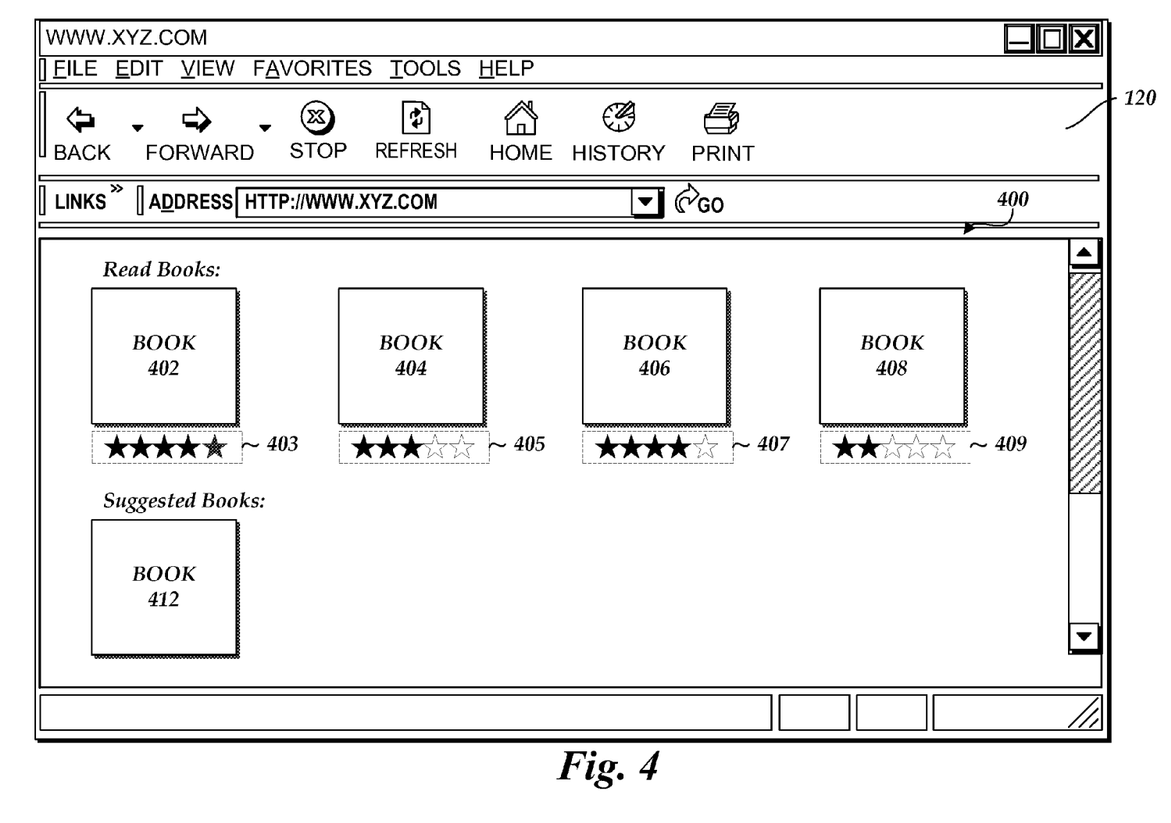
FIG. 4 illustrates an example of a representation of a network page displayed on a user device, such as the user device.

FIG. 4 illustrates an example of a representation of a network page 400 displayed on a user device, such as the user device 102. The network page 400 may be displayed within the user interface of the browser application 120 of the user device 102. As illustrated in FIG. 4, the network page 400 includes content, such as list of books 402, 404, 406, and 408 read by a user, ratings 403, 405, 407, and 409 for each read book, and a suggested book 412 to read.

As described herein, the user device 102 may open the network page 400. In response to opening the network page 400, the recommendation system 104 may access the positive and/or negative models associated with the user of the user device 102. The positive and/or negative models may have been generated by the recommendation system 104 at a previous time based on the ratings 403, 405, 407, and 409 associated with the books 402, 404, 406, and 408, respectively, read by the user. The recommendation system 104 may compare the positive model with fingerprints of literary works in a digital library or database, such as the literary works fingerprint database 146. As illustrated in FIG. 4, the recommendation system 104 may determine that the book 412 has a fingerprint that matches or closely matches the positive model and may transmit an identity of the book 412 to the user device 102 for display by the browser application 120 in the network page 400. In some embodiments, each recommended book may be presented together with an auto-generated explanation of why the book is being recommended. An example of such an explanation is: "recommended because this book is syntactically similar to <book title 1> and <book title 2>, which you rated highly."

Additional Embodiments

The recommendation system 104 of FIGS. 1A-B may be a single computing device, or it may include multiple distinct computing devices, such as computer servers, logically or physically grouped together to collectively operate as a server system. The components of the recommendation system 104 can each be implemented in application-specific hardware (e.g., a server computing device with one or more ASICs) such that no software is necessary, or as a combination of hardware and software. In addition, the modules and components of the recommendation system 104 can be combined on one server computing device or separated individually or into groups on several server computing devices. In some embodiments, the recommendation system 104 may include additional or fewer components than illustrated in FIGS. 1A-B.

In some embodiments, the features and services provided by the recommendation system 104 (e.g., a literary works recommendation service) may be implemented as web services consumable via the communication network 110. In further embodiments, the recommendation system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for analyzing a corpus of text in real-time to provide a recommendation to a user comprising:
   a literary works fingerprint database comprising an identity of a plurality of literary works and a fingerprint associated with each literary work of the plurality;
   a user database comprising an identification of a plurality of users and one or more ratings associated with at least some users, wherein each rating is assigned to a literary work by the respective user; and
   a server system configured to:
      receive a recommendation request from a user device associated with a first user in the plurality of users;
      retrieve a positive model associated with the first user, wherein the positive model is based on fingerprints associated with a first set of literary works in the plurality of literary works that are assigned a rating above a first threshold value by the first user;
      retrieve at least one of the fingerprints stored in the literary works fingerprint database, wherein the fingerprints stored in the literary works fingerprint database are based on a semantic analysis and a syntactic analysis of the literary work associated with the respective fingerprint, and wherein the syntactic analysis includes counting at least one type of syntactical occurrence in text of the literary work associated with the respective fingerprint;
      compare the positive model with the retrieved fingerprints;
      identify one or more second literary works in the plurality of literary works that are associated with a fingerprint that is within a second threshold value of the positive model; and
      transmit an identity of the one or more second literary works to the user device for display in a user interface.

2. The system of claim 1, wherein the server system is further configured to:
   retrieve a negative model associated with the first user, wherein the negative model is based on fingerprints associated with a second set of literary works in the plurality of literary works that are assigned a rating below a third threshold value by the first user;
   compare the negative model with the retrieved fingerprints;
   identify one or more third literary works in the plurality of literary works that are associated with a fingerprint that is within a fourth threshold value of the negative model; and
   prevent transmission of an identity of the one or more third literary works to the user device.

3. The system of claim 1, wherein the syntactic analysis comprises computing lexical data or grammatical data for a literary work in the first set.

4. The system of claim 1, wherein the retrieved fingerprints each comprise a set of metrics, and wherein the set of metrics are aggregated to form the respective fingerprint using at least one of logistic regression, clustering, or machine-learning techniques.

5. The system of claim 1, wherein the server system is further configured to compare the positive model with the retrieved fingerprints by comparing metrics of the positive model and metrics of the retrieved fingerprints that are selected using machine-learning techniques.

6. The system of claim 1, wherein the server system is further configured to:
   rank the one or more second literary works according to a proximity of a fingerprint associated with a respective second literary work to the positive model; and
   transmit the ranking of the one or more second literary works to the user device.

7. A computer-implemented method of analyzing a corpus of text to provide a recommendation to a user, the method comprising:
   as implemented by a computer system comprising one or more computing devices, the computer system configured with specific executable instructions,
   receiving an indication to provide a recommendation to a user device associated with a first user, wherein one or more ratings are associated with the first user, and wherein each rating is assigned to a literary work by the first user;
   retrieving a positive model associated with the first user, wherein the positive model is generated based on a first set of literary works that are assigned a rating above a first threshold value by the first user;
   retrieving at least one fingerprint stored in a literary works fingerprint database, wherein each fingerprint is associated with one literary work in a plurality of literary works;
   comparing the positive model with the retrieved fingerprints;
   identifying one or more second literary works in the plurality of literary works that are associated with a fingerprint that is within a second threshold value of the positive model; and
   transmitting an identity of the one or more second literary works to the user device.

8. The computer-implemented method of claim 7, further comprising:
   retrieving a negative model associated with the first user, wherein the negative model is generated based on a second set of literary works that are assigned a rating below a third threshold value by the first user;

comparing the negative model with the retrieved fingerprints;
identifying one or more third literary works in the plurality of literary works that are associated with a fingerprint that is within a fourth threshold value of the negative model; and
preventing transmission of an identity of the one or more third literary works to the user device.

9. The computer-implemented method of claim 7, further comprising:
receiving an indication that the first set of literary works includes a new literary work;
determining an updated positive model based on fingerprints associated with the first set of literary works.

10. The computer-implemented method of claim 9, further comprising:
receiving an indication to provide a second recommendation to the user device associated with the first user;
comparing the updated positive model with the retrieved fingerprints;
identifying one or more third literary works in the plurality of literary works that are associated with a fingerprint that is within the second threshold value of the updated positive model; and
transmitting an identity of the one or more third literary works to the user device.

11. The computer-implemented method of claim 7, wherein the retrieved fingerprints are generated based on semantic metrics and syntactic metrics.

12. The computer-implemented method of claim 7, wherein comparing the positive model with the retrieved fingerprints comprises:
selecting metrics of the positive model and metrics of the retrieved fingerprints using machine-learning techniques; and
comparing the selected metrics of the positive model with the selected metrics of the retrieved fingerprints.

13. The computer-implemented method of claim 7, further comprising:
ranking the one or more second literary works according to a proximity of a fingerprint associated with a respective second literary work to the positive model; and
transmitting the ranking of the one or more second literary works to the user device.

14. A non-transitory computer-readable medium having stored thereon a recommendation module for analyzing a corpus of text to provide a recommendation to a user, the recommendation module comprising executable code that, when executed on a computing device, implements a process comprising:

receiving an indication to provide a recommendation to a user device associated with a first user, wherein one or more ratings are associated with the first user, and wherein each rating is assigned to a literary work by the first user;
retrieving a positive model associated with the first user, wherein the positive model is generated based on a first set of literary works that are assigned a rating above a first threshold value by the first user;
retrieving at least one fingerprint stored in a literary works fingerprint database, wherein each fingerprint is based on an analysis of a text of a literary work associated with the respective fingerprint;
comparing the positive model with at the retrieved fingerprints;
identifying one or more second literary works in the plurality of literary works that are associated with a fingerprint that is within a second threshold value of the positive model; and
transmitting an identity of the one or more second literary works to the user device for display in a user interface.

15. The non-transitory computer-readable medium of claim 14, wherein the recommendation module further implements a process comprising:
retrieving a negative model associated with the first user, wherein the negative model is generated based on a second set of literary works that are assigned a rating below a third threshold value by the first user;
comparing the negative model with the retrieved fingerprints;
identifying one or more third literary works in the plurality of literary works that are associated with a fingerprint that is within a fourth threshold value of the negative model; and
preventing transmission of an identity of the one or more third literary works to the user device.

16. The non-transitory computer-readable medium of claim 15, wherein the retrieved fingerprints are generated based on semantic metrics and syntactic metrics.

17. The non-transitory computer-readable medium of claim 14, wherein the recommendation module further implements a process comprising:
selecting metrics of the positive model and metrics of the retrieved fingerprints using machine-learning techniques; and
comparing the selected metrics of the positive model with the selected metrics of the retrieved fingerprints.

* * * * *